Figure 1:
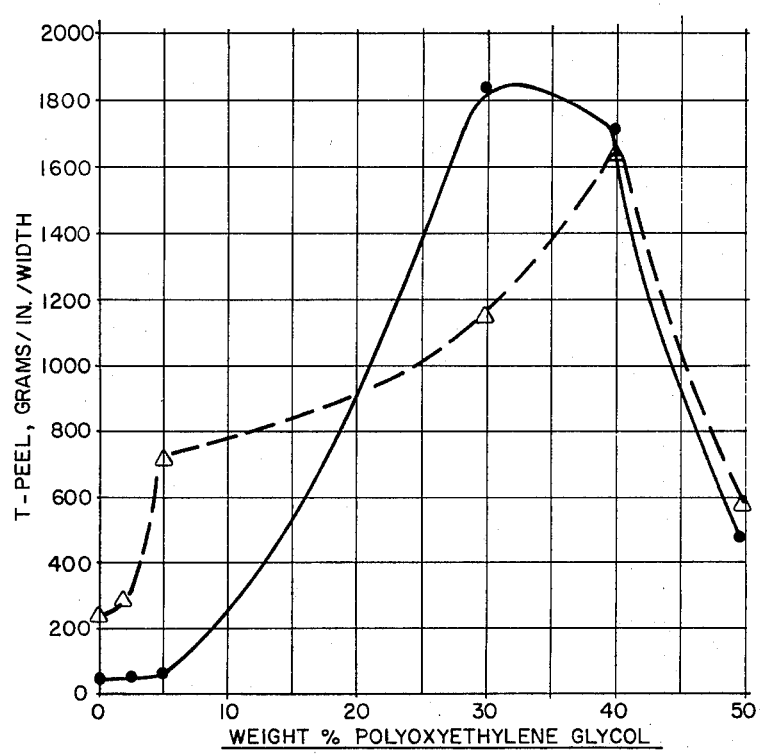

United States Patent [19]

Sublett

[11] 4,062,907
[45] Dec. 13, 1977

[54] POLYESTER HOT MELT ADHESIVE

[75] Inventor: Bobby J. Sublett, Kingsport, Tenn.

[73] Assignee: Eastman Kodak Company, Rochester, N.Y.

[21] Appl. No.: 741,907

[22] Filed: Nov. 15, 1976

Related U.S. Application Data

[63] Continuation-in-part of Ser. No. 607,169, Aug. 25, 1976, abandoned.

[51] Int. Cl.² .............. C08L 67/02; C08G 63/66; C08G 63/68
[52] U.S. Cl. .................... 260/860; 156/332; 260/75 R; 260/75 N
[58] Field of Search ............ 260/75 R, 75 N, 860; 156/332

[56] References Cited

U.S. PATENT DOCUMENTS

| 3,013,914 | 12/1961 | Willard | 260/75 R |
|---|---|---|---|
| 3,423,281 | 1/1969 | Wiener | 260/75 R |
| 3,669,921 | 6/1972 | Droke et al. | 260/75 R |
| 3,682,863 | 8/1972 | McHale | 260/75 R |
| 3,867,479 | 2/1975 | Spanninger | 260/75 N |
| 3,873,639 | 3/1975 | Crescentini et al. | 260/75 N |
| 3,932,326 | 1/1976 | Hoh et al. | 260/75 R |
| 3,948,859 | 4/1976 | Sublett et al. | 260/75 R |

OTHER PUBLICATIONS

Hill et al., *Journal of Polymer Science*, vol. 3, No. 5 (1948), pp. 609–629.

*Primary Examiner*—Walter C. Danison
*Attorney, Agent, or Firm*—Charles R. Martin; Daniel B. Reece, III

[57] ABSTRACT

Polyesters useful as hot melt adhesives are prepared from selected dicarboxylic acids and selected diols, which include a critical range of polyoxyethylene glycols. In a first embodiment of the invention, the polyester is prepared from terephthalic acid, isophthalic acid, adipic acid, 1,4-butanediol, ethylene glycol, and 20 to 45 weight percent of the selected polyoxyethylene glycols. In a second embodiment of the invention, the polyester is prepared from terephthalic acid, acipic acid, 1,6-hexanediol, ethylene glycol, and 2 to 40 weight percent of the selected polyoxyethylene glycols.

4 Claims, 2 Drawing Figures

POLYESTER HOT MELT ADHESIVE

This application is a continuation-in-part of my co-pending application Ser. No. 607,169, filed Aug. 25, 1976, now abandoned.

This invention relates to polyesters useful as hot melt adhesives prepared using critical amounts of selected polyoxyethylene glycols. The hot melt adhesives of this invention are particularly useful for bonding chemically dissimilar plastic films with smooth surfaces.

Polyester hot melt adhesives similar to the polyester hot melt adhesives of this invention are well known in the art. The state of the art is illustrated by U.S. Pat. Nos. 3,932,326; 3,505,293; 3,502,620; 3,668,277; 3,669,921; 3,682,863; 3,699,187, 3,423,281; Defensive Publication T925,005; and Hill et al *Journal of Polymer Science*, Vol. 3(5), (1948), pages 609–629.

While polyester hot melt adhesives are well suited for bonding similar materials together, such as metal to metal, or fabric to fabric, polyester hot melt adhesives often are not suitable for bonding dissimilar materials together because the adhesive must simultaneously adhere to two dissimilar materials. For example, polyesters containing terephthalic acid and ethylene glycol are known to have good adhesion to polyethylene terephthalate films, but these types of polyesters are not noted for having good adhesion to smooth films of polymers which are generically different than polyesters, such as cellulose esters.

In order for an adhesive to be acceptable for most uses, the adhesive is required to exhibit the combination of acceptable initial bond strength and acceptable bond strength after ageing. Polyester adhesives used to bond dissimilar materials are no exception to this requirement and, furthermore, it is more difficult to achieve the combination of acceptable initial and aged bond strength when dissimilar materials are bonded together than when similar materials are bonded together.

I have unexpectedly found that the use of a critical range of selected polyoxyethylene glycols provides polyester hot melt adhesive compositions having the unobvious combination of acceptable initial bond strength and acceptable aged bond strength. In most cases, the polyester hot melt adhesive compositions of this invention exhibit the unobvious combination of acceptable initial bond strength and an aged bond strength which is actually greater than the initial bond strength.

There are two embodiments of the polyester hot melt adhesives of this invention.

In the broader aspect of the first embodiment of the invention, the polyester has an inherent viscosity of at least 0.5 and is comprised of A. a dicarboxylic acid component which is
 1. 25 to 65 mole percent terephthalic acid,
 2. 10 to 25 mole percent isophthalic acid,
 3. 25 to 50 mole percent adipic acid,
B. a diol component which is
 1. 60 to 25 mole percent 1,4-butanediol,
 2. 40 to 75 mole percent ethylene glycol, and
 3. 20 to 45 weight percent, based on the weight of the polyester, of a polyoxyethylene glycol selected from the group consisting of

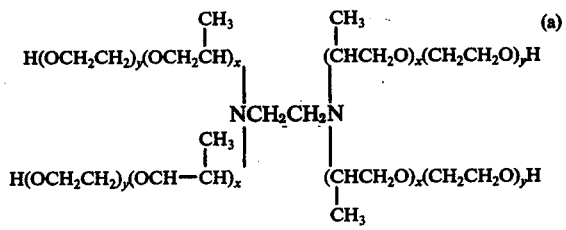

where $x$ is in the range of 1 to 127 and $y$ is in the range of 1 to 110,

where $x$ is in the range of 16 to 612, and (c) $H(OCH_2CH_2)_x$—OH where $x$ is in the range of 4 to 180.

In a preferred aspect of the first embodiment the polyester is comprised of
A. a dicarboxylic acid component which is
 1. 40 to 60 mole percent terephthalic acid,
 2. 15 to 25 mole percent isophthalic acid,
 3. 25 to 40 mole percent adipic acid,
B. a diol component which is
 1. 60 to 40 mole percent 1,4-butanediol,
 2. 40 to 60 mole percent ethylene glycol, and
 3. 30 to 40 weight percent, based on the weight of the polyester, of the same polyoxyethylene glycols useful in the broader aspect of the first embodiment of the invention.

In the broader aspect of the second embodiment of this invention, the polyester has an inherent viscosity of at least 0.5 and is comprised of
A. a dicarboxylic acid component which is
 1. 100 to 60 mole percent terephthalic acid,
 2. 0 to 40 mole percent adipic acid,
B. a diol component which is
 1. 70 to 30 mole percent 1,6-hexanediol,
 2. 30 to 70 mole percent ethylene glycol, and
 3. 2 to 40 weight percent, based on the weight of the polyester, of the same polyoxyethylene glycols useful in the first embodiment of the invention.

In a preferred aspect of the second embodiment of the invention the polyester is comprised of
A. a dicarboxylic acid component which is
 1. 80 to 60 mole percent terephthalic acid,
 2. 20 to 40 mole percent alipic acid,
B. a diol component which is
 1. 60 to 40 mole percent 1,6-hexanediol,
 2. 40 to 60 mole percent ethylene glycol, and
 3. 5 to 30 weight percent, based on the weight of the polyester of the same polyoxyethylene glycols useful in the first embodiment of the invention.

As disclosed above, the selected polyoxyethylene glycols useful in this invention are selected from the group consisting of

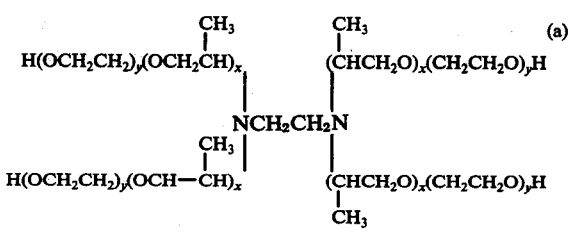 (a)

where $x$ is in the range of 1 to 127 and $y$ is in the range of 1 to 110,

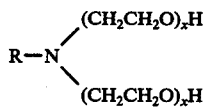 (b)

where $x$ is in the range of 16 to 612, and (c)  

where $x$ is in the range of 4 to 180.

The polyoxyethylene glycols useful in this invention are well known in the art and are commercially available. For example, polyoxyethylene glycol (a) is sold by Wyandotte Chemical Corporation under the trade name Tetronic and can be prepared in accordance with U.S. Pat. No. 2,979,528. Preferably polyoxyethylene (a) is either a compound wherein $x$ is 7 and $y$ is 6 sold under the trade name Tetronic 304, or a compound wherein $x$ is 23 and $y$ is 122 sold under the trade name Tetronic 1508, or a compound wherein $x$ is 14 and $y$ is 43 sold under the trade name Tetronic 707. Polyoxyethylene glycol (b) is sold by Armak Chemicals under the trade name Ethomeen. Preferably polyoxyethylene (b) is a compound where $x$ is 15 sold under the trade name Ethomeen 18/25. Polyoxyethylene glycol (c) is sold by Union Carbide Company under the trade name Carbowax. Preferably polyoxyethylene (c) is a compound where $x$ is 34 sold under the trade name Carbowax 1540.

The polyesters of this invention have an inherent viscosity of at least 0.5 measured at 25° C. using 0.5 gram of polymer per 100 ml. of a solvent composed of 60 volumes of phenol and 40 volumes of tetrachloroethane.

The polyesters of this invention can be prepared by methods well known in the art, such as acidolysis, ester interchange, or direct condensation. Preferably, ester interchange is used.

The hot melt adhesives of this invention are polyesters derived from the reaction of several glycols and several dicarboxylic acids. As will be readily understood by those skilled in the art, the moles of diol in the mixture of glycols must be equal to the moles of dicarboxylic acid in the mixture of dicarboxylic acids in order to form the polyester of the invention having an inherent viscosity of at least 0.5.

While reference to the acid components of the polyester has been to the acid form, such as terephthalic acid, ester forming derivatives of such acids, such as dimethyl terephthalate, can be employed to prepare the polyesters of this invention.

If desired, dye or dye receptive agents, color stabilizers and various other adjuvants may be added to the polyester hot melt adhesives of this invention to meet certain specific end use requirements. Such additives would normally be added to the polymerization mixture from which the polyester is produced.

The use of the polyester hot melt adhesives of this invention to bond chemically dissimilar surfaces is not limited to bonding polyethylene terephthalate and cellulose acetate. These adhesives are also useful for bonding other dissimilar surfaces, such as glass to cellulose acetate, and paper to cellulose acetate.

The use of the polyester hot melt adhesives of this invention is not limited to bonding chemically dissimilar surfaces. For example, the polyester hot melt adhesives of this invention can be used for bonding metals to metals, glass to glass, wood to wood, and the like.

Applicant regards U.S. Pat. No. 3,932,326 as the closest prior art. U.S. Pat. No. 3,932,326 discloses pressure sensitive adhesives composed of polyesters similar to the polyesters of this invention.

The polyesters of this invention are thought to be novel over the polyesters disclosed in U.S. Pat. No. 3,932,326 for several reasons. This patent does not disclose the specific components used to prepare the polyesters of applicant's invention. Also, this patent does not disclose the specific ranges of the components of the polyester of this invention, including specifically the critical range of the polyoxyethylene glycol.

The polyesters of this invention are though to be unobvious over the polyesters disclosed in U.S. Pat. No. 3,932,326 because this patent does not provide an obvious basis for the critical range of polyoxyethylene glycol used in the polyester of this invention. Thus, the polyesters of this invention are though to be unobvious over the polyesters disclosed in this patent because the adhesion to chemically dissimilar plastics of the polyesters of this invention are unobvious over the adhesion to chemically dissimilar plastics of similar polyesters prepared from the same dicarboxylic acid and diol components but using an amount of polyoxyethylene glycol that is below or above the claimed critical range. Thus, the unobvious adhesion of the polyesters of this invention result from the use of a critical range of polyoxyethylene glycol as distinguished from use of an amount of polyoxyethylene glycol either above or below the critical range.

The unobvious adhesion properties of the polyesters of this invention can be fully appreciated by considering the attached Figures.

In the Figures, the horizontal scale represents the amount of polyoxyethylene glycol in the polyester, expressed in weight percent, based on the weight of the polyester. The vertical scale represents the adhesion properties of the polyester when polyethylene terephthalate film is bonded to cellulose acetate film, measured in T-peel strength, which is expressed in grams per inch of width. Presented in each Figure is a curve correlating the relationship between the weight percent of polyoxyethylene glycol in the polyester and both the initial and aged bond strength of the polyester.

The data used to prepare the curves in FIG. 1 are related to the adhesive properties of the polyesters of the first embodiment of the invention. The data are obtained by preparing polyesters containing 0, 2.5, 5, 30, 40 and 50 weight percent polyoxyethylene glycol in a polyester composed of 65 mole percent terephthalic acid, 10 mole percent isophthalic acid, 25 mole percent adipic acid, 50 mole percent, 1,4-butanediol and 50 mole percent ethylene glycol.

Figure 2:
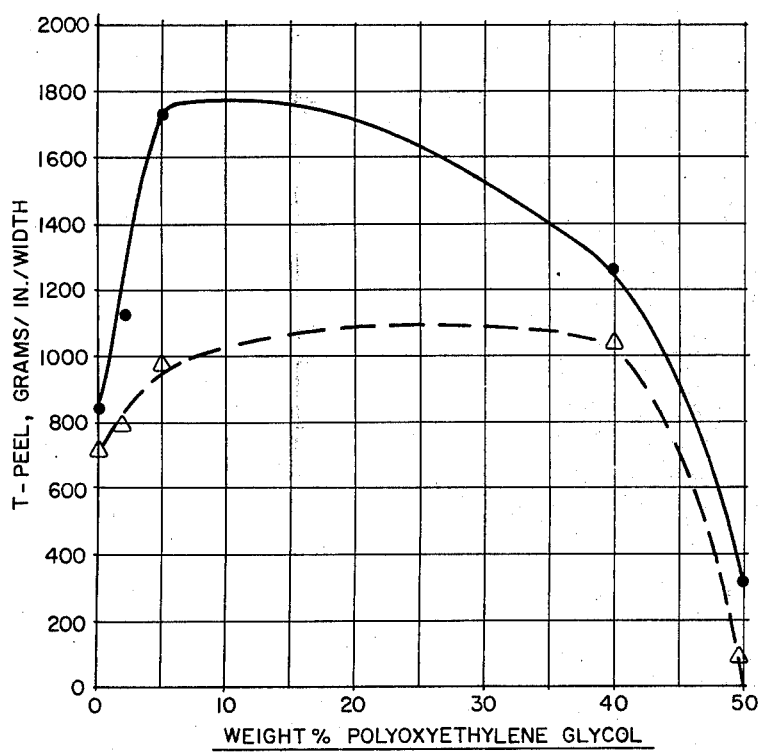

The data used to prepare the curves in FIG. 2 are related to the adhesive properties of the polyesters of the second embodiment of the invention. These data are obtained by preparing polyesters containing 0, 2.5, 5, 40 and 50 weight percent polyoxyethylene glycol in a polyester composed of 70 mole percent terephthalic acid, 30 mole percent adipic acid, 50 mole percent 1,6-hexanediol, and 50 mole percent ethylene glycol.

The polyesters used to prepare the curves of both FIGS. 1 and 2 are prepared by ester interchanging the dimethyl ester of the acid components with a 300-100% molar excess of the diol components in the presence of a catalytic amount of a suitable metallic catalyst, such as titanium isopropoxide.

The adhesive properties of the polyesters are determined by using each of the polyesters to bond cellulose acetate film to polyethylene terephthalate film in the form of strips 1 in. by 6 in. The bond is a film 0.5 mil in thickness prepared at one end of the strip covering an area of 1 sq. in. The polyester hot melt adhesive films are cast from a chloroform solution onto the polyethylene terephthalate film and air dried. The adhesive coated polyethylene terephthalate film is then bonded to the cellulose acetate film at 325° F. for 1 sec. using conventional heat sealing techniques. The T-peel strength is then determined in accordance with ASTM 1002 both initially at 23° C. and 50% relative humidity and after ageing 6 days at 23° C. and 50% relative humidity. The T-peel strength is reported in grams per inch of bond along the peel direction per inch of bond width. The values of initial T-peel strength for each of the polyesters is then plotted on the Figures as triangles and a suitable curve prepared. The values of aged T-peel strength for each of the polyesters is then plotted on the Figures as dots and a suitable curve prepared.

As will be appreciated from a consideration of the curve in FIG. 1, if less than about 20 or more than about 45 weight percent polyoxyethylene glycol is used, both the initial and aged T-peel strength is undesirably low. For example the aged T-peel strength is less than about 900 gram/in./width. In contrast, if the amount of polyoxyethylene glycol is from 20 to 45 weight percent, the initial T-peel strength is quite acceptable and the aged T-peel strength is unobviously high. For example, in the preferred range of 30 to 40 weight percent polyoxyethylene glycol, the aged T-peel strength is a minimum of about 1600 gram/in./width and achieves a maximum value of over 1800 gram/in./width at about 32 weight percent polyoxyethylene glycol.

As will be appreciated from a consideration of the curve in FIG. 2, if less than about 2 or more than about 40 weight percent polyoxyethylene glycol is used, the aged T-peel strength is less than about 1300 gram/in./width. In contrast, if the amount of polyoxyethylene glycol is from 2 to 40 weight percent, the initial T-peel strength is quite acceptable and the aged T-peel strength is unobviously high. For example, in the preferred range of 5 to 30 mole percent polyoxyethylene glycol, the aged T-peel strength is a minimum of about 1500 gram/in./width and achieves a maximum value of almost 1800 gram/in./width at around 5 to 15 weight percent polyoxyethylene glycol.

The polyesters of this invention have been described as "consisting essentially of" the dicarboxylic acid and diol components. By the term "consisting essentially of" we mean that these polyesters can contain other materials as long as the obvious adhesion properties are retained. For example, other dicarboxylic acids and diols could be used if the resulting polyester retains the unobvious adhesion properties of the polyester of the invention. Also, conventional additives for adhesives, such as antioxidants, stabilizers, pigments and the like can be incorporated into the polyester of this invention as long as the polyester retains unobvious adhesion properties.

The polyesters of this invention can be used as a hot melt adhesive using apparatus and techniques well known in the art.

I claim:

1. A polyester having an inherent viscosity of at least 0.5 consisting essentially of
A. a dicarboxylic acid component which is
   1. 25 to 65 mole percent terephthalic acid,
   2. 10 to 25 mole percent isophthalic acid,
   3. 25 to 50 mole percent adipic acid,
B. a diol component which is
   1. 60 to 25 mole percent 1,4-butanediol,
   2. 40 to 75 mole percent ethylene glycol, and
   3. 20 to 45 weight percent, based on the weight of the polyester, of a polyoxyethylene glycol selected from the group consisting of

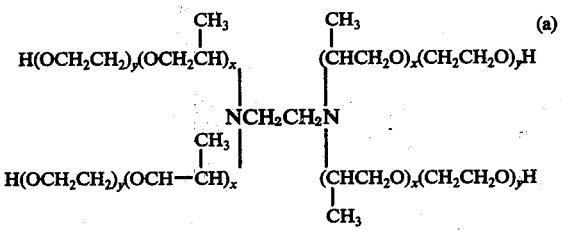

where $x$ is in the range of 1 to 127 and $y$ is in the range of 1 to 110,

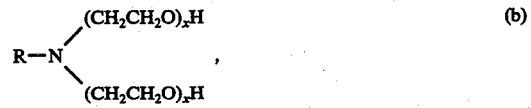

where $x$ is in the range of 16 to 612, and (c) $H(OCH_2CH_2)_x-OH$ where $x$ is in the range of 4 to 180.

2. A polyester having an inherent viscosity of at least 0.5 consisting essentially of
A. a dicarboxylic acid component which is
   1. 40 to 60 mole percent terephthalic acid,
   2. 15 to 25 mole percent isophthalic acid,
   3. 25 to 40 mole percent adipic acid,
B. a diol component which is
   1. 60 to 40 mole percent 1,4-butanediol,
   2. 40 to 60 mole percent ethylene glycol, and
   3. 30 to 40 weight percent, based on the weight of the polyester, of a polyoxyethylene glycol selected from the group consisting of

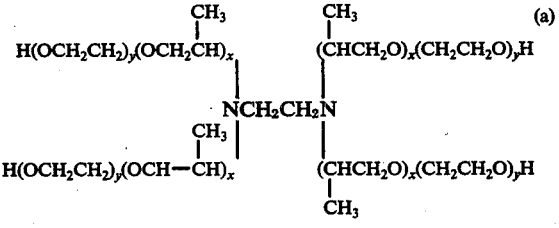

where $x$ is in the range of 1 to 127 and $y$ is in the range of 1 to 110,

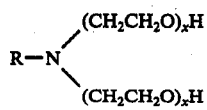  (b)

where $x$ is in the range of 16 to 612, and (c)   $H(OCH_2CH_2)_x$—OH where $x$ is in the range of 4 to 180.

3. A polyester having an inherent viscosity of at least 0.5 consisting essentially of A. a dicarboxylic acid component which is
 1. 100 to 60 mole percent terephthalic acid,
 2. 0 to 40 mole percent adipic acid,
B. a diol component which is
 1. 70 to 30 mole percent 1,6-hexanediol,
 2. 30 to 70 mole percent ethylene glycol, and
 3. 2 to 40 weight percent, based on the weight of the polyester, of a polyoxyethylene glycol selected from the group consisting of

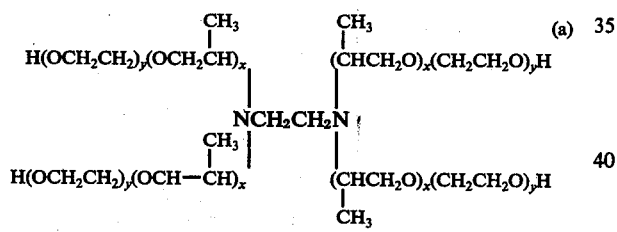  (a)

where $x$ is in the range of 1 to 127 and $y$ is in the range of 1 to 110,

  (b)

where $x$ is in the range of 16 to 612, and (c)   $H(OCH_2CH_2)_x$—OH where $x$ is in the range of 4 to 180.

4. A polyester having an inherent viscosity of at least 0.5 consisting essentially of A. a dicarboxylic acid component which is
 1. 80 to 60 mole percent terephthalic acid,
 2. 20 to 40 mole percent adipic acid,
B. a diol component which is
 1. 60 to 40 mole percent 1,6-hexanediol,
 2. 40 to 60 mole percent ethylene glycol, and
 3. 5 to 30 weight percent, based on the weight of the polyester, of a polyoxyethylene glycol selected from the group consisting of

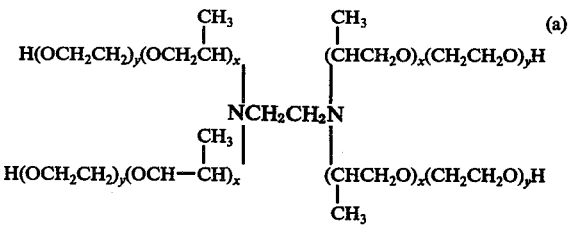  (a)

where $x$ is in the range of 1 to 127 and $y$ is in the range of 1 to 110,

  (b)

where $x$ is in the range of 16 to 612, and (c)   $H(OCH_2CH_2)_x$—OH where $x$ is in the range of 4 to 180.

* * * * *